(12) United States Patent
Chen et al.

(10) Patent No.: US 10,204,146 B2
(45) Date of Patent: Feb. 12, 2019

(54) AUTOMATIC NATURAL LANGUAGE PROCESSING BASED DATA EXTRACTION

(71) Applicant: CA, INC., New York, NY (US)

(72) Inventors: Ye Chen, Milpitas, CA (US); Jin Zhang, Palo Alto, CA (US); Chi Zhang, Catsonville, MD (US)

(73) Assignee: CA, Inc., New York, NY (US)

(*) Notice: Subject to any disclaimer, the term of this patent is extended or adjusted under 35 U.S.C. 154(b) by 255 days.

(21) Appl. No.: 15/019,550

(22) Filed: Feb. 9, 2016

(65) Prior Publication Data

US 2017/0228439 A1 Aug. 10, 2017

(51) Int. Cl.
*G06F 17/30* (2006.01)
*G06F 17/27* (2006.01)

(52) U.S. Cl.
CPC ...... *G06F 17/30539* (2013.01); *G06F 17/271* (2013.01); *G06F 17/2785* (2013.01); *G06F 17/3043* (2013.01); *G06F 17/30569* (2013.01)

(58) Field of Classification Search
CPC ........ G06N 5/02; G06N 5/022; G06F 17/279; G06F 17/2795; G06F 17/20; G06F 17/28
USPC ........................................ 707/603
See application file for complete search history.

(56) References Cited

U.S. PATENT DOCUMENTS

| | | | |
|---|---|---|---|
| 6,825,849 B1* | 11/2004 | Minakuchi | G06F 17/214 345/581 |
| 7,478,106 B2 | 1/2009 | Heckerman | |
| 7,774,361 B1 | 8/2010 | Nachenberg | |
| 8,019,594 B2 | 9/2011 | Weng | |
| 8,022,952 B2* | 9/2011 | Hao | G06T 11/206 345/440 |
| 8,117,203 B2 | 2/2012 | Gazen | |
| 8,271,262 B1* | 9/2012 | Hsu | A61B 5/05 704/206 |
| 8,301,638 B2 | 10/2012 | Xu | |
| 8,418,249 B1 | 4/2013 | Nucci | |
| 9,319,421 B2 | 4/2016 | Ferragut | |
| 2001/0049601 A1* | 12/2001 | Kroeker | G06F 17/271 704/254 |
| 2004/0205374 A1 | 10/2004 | Poletto | |
| 2005/0190069 A1* | 9/2005 | Kemper | G08B 1/08 340/692 |

(Continued)

FOREIGN PATENT DOCUMENTS

EP 1378855 1/2004

OTHER PUBLICATIONS

Notice of Allowance dated Feb. 12, 2018, U.S. Appl. No. 15/082,809.

(Continued)

*Primary Examiner* — Hanh B Thai
(74) *Attorney, Agent, or Firm* — Vierra Magen Marcus LLP

(57) ABSTRACT

A data-driven big data mining and reporting system automatically identifies which data attributes to report from a first data set using natural language processing. The identified data attributes to report from the first data set is used to automatically extract additional data attributes to report from additional data sets so that the identified data attributes to report from the first data set and the extracted data attributes to report from the additional data sets can be reported without input from the end user.

20 Claims, 17 Drawing Sheets

(56) References Cited

U.S. PATENT DOCUMENTS

| | | | |
|---|---|---|---|
| 2006/0161814 A1* | 7/2006 | Wocke | G06K 9/6251 |
| | | | 714/26 |
| 2007/0219933 A1* | 9/2007 | Datig | G06F 17/279 |
| | | | 706/4 |
| 2008/0117213 A1 | 5/2008 | Cirit | |
| 2008/0126275 A1 | 5/2008 | Crnojevic | |
| 2008/0140589 A1 | 6/2008 | Basu | |
| 2009/0030753 A1 | 1/2009 | Senturk-Doganaksoy | |
| 2009/0271664 A1 | 10/2009 | Haas | |
| 2010/0083054 A1 | 4/2010 | Marvasti | |
| 2011/0191277 A1 | 8/2011 | Agundez | |
| 2011/0208703 A1* | 8/2011 | Fisher | G06F 17/3092 |
| | | | 707/692 |
| 2013/0067070 A1 | 3/2013 | Rowe | |
| 2013/0198119 A1* | 8/2013 | Eberhardt, III | G06N 99/005 |
| | | | 706/12 |
| 2014/0046892 A1 | 2/2014 | Gopalakrishnan | |
| 2014/0058705 A1 | 2/2014 | Brill | |
| 2014/0280257 A1 | 9/2014 | Aliferis | |
| 2014/0282163 A1* | 9/2014 | MacKinlay | G06Q 10/10 |
| | | | 715/769 |
| 2015/0149391 A1* | 5/2015 | Ziolko | G06N 7/02 |
| | | | 706/11 |
| 2015/0199607 A1* | 7/2015 | Fang | G06N 5/04 |
| | | | 706/55 |
| 2016/0127402 A1 | 5/2016 | Verramachaneni | |
| 2016/0224899 A1 | 8/2016 | Nguyen | |
| 2016/0226901 A1 | 8/2016 | Baikalov | |
| 2017/0139760 A1 | 5/2017 | Rahman | |

OTHER PUBLICATIONS

Response to Office Action dated Feb. 2, 2018, U.S. Appl. No. 15/081,585.
Office Action dated Nov. 3, 2017, U.S. Appl. No. 15/081,585.
Office Action dated Sep. 1, 2017, U.S. Appl. No. 15/082,809, filed Mar. 28, 2016.
Chen, et al., U.S. Appl. No. 15/081,585, filed Mar. 25, 2016.
Chen, et al., U.S. Appl. No. 15/082,809, filed Mar. 28, 2016.
Response to Office Action dated Dec. 1, 2017, U.S. Appl. No. 15/082,809, filed Mar. 28, 2016.
Preliminary Amendment filed Aug. 6, 2018 in U.S. Appl. No. 15/981,609, 9 pages.
Notice of Allowance Action dated Mar. 26, 2018, U.S. Appl. No. 15/081,585.

* cited by examiner

[11:50:29 EST] ---------------------- START ----------------------
[11:50:29 EST] Staging repo: latest.ferrari
[11:57:04 EST] Staging complete
[11:57:10 EST] Platformer version: "2.3.11.718"
[11:57:10 EST] Building instance...
[13:37:36 EST] init_instance FAILED after 100m23.470s
[13:37:39 EST] check_instance SUCCESS
...

Figure 11B (LBRACKET, TIMEHOUR, COLON, MINUTE, COLON, TIMESECOND, SPACE, PLATFORMSTART)

Figure 11C

{
PLATFORMSTARTLINE (?:%{PLATFORMTIMESTEPS}%{PLATFORMSTART}),
PLATFORMTIMESTEPS (?:%{PLATFORMTIMESTEP}%{SPACE}),
PLATFORMTIMESTEP (?:%{LBRACKETTIMENTZ}%{RBRACKET}),
LBRACKETTIMENTZ (?:%{LBRACKET}%{TIMENTZ}),
...
}

Figure 12B

Is_feature:
Node_ID:
Node_name:
Node_type:
Node_range:
Node_rank:
Split:

Figure 12C

Node_ID:
Regular_pattern:
Node_range:
Node_string:

Is_feature: False
Node_ID:PLATFORMSTARTLINE
Node_name:
Node_type:
Node_range: (0,65)
Node_rank:
Split: 15

Is_feature: False
Node_ID: LBRACKETTIMENTZ
Node_name:
Node_type:
Node_range: (0,12)
Node_rank:
Split: 1

Is_feature: True
Node_ID: TIMENTZ
Node_name: timestamp
Node_type: timestamp
Node_range: (1,12)
Node_rank: 0.2
Split: 10

Node_ID: Regular8
Regular_pattern: (?:[0-5][0-9])
Node_range: (4,5)
Node_string: 50

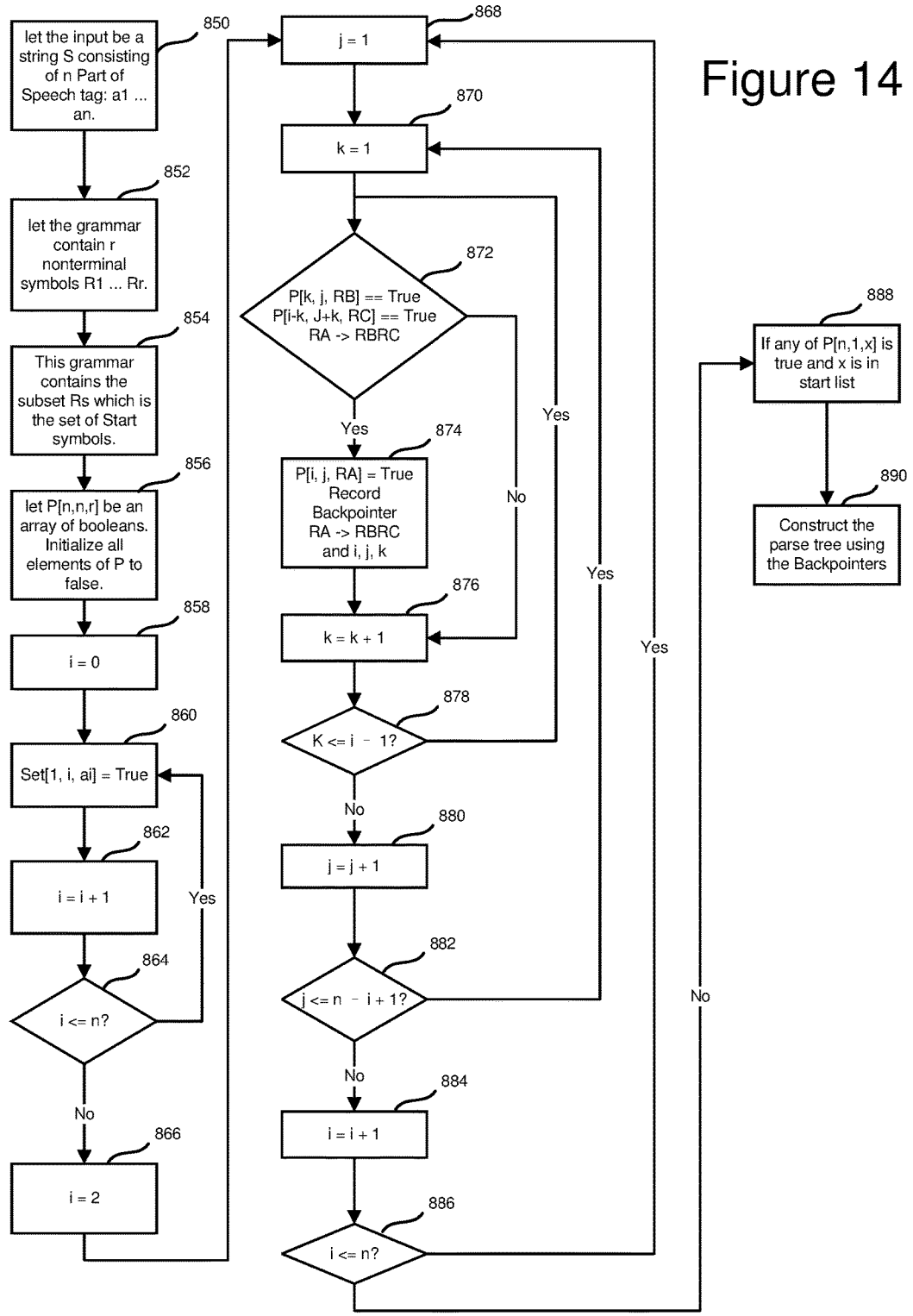

AUTOMATIC NATURAL LANGUAGE PROCESSING BASED DATA EXTRACTION

BACKGROUND

Machine-generated data can be a valuable source of information. For example, log files of a web based system may provide insights into the health and use of Data Analysis Server 20 which will allow the manager of Data Analysis Server 20 to keep Data Analysis Server 20 running and maximize use of Data Analysis Server 20.

Such machine-generated data tends to be voluminous and, therefore, has been referred to as "Big Data." Because of the sheer amount of data, Big Data can be difficult to process. Additionally, such machine-generated data is often semi-structured, which further complicates the analysis.

Past attempts to analyze machine-generated data have required specific programs and rules to be created, which can be a difficult task and adds significant workload to the users.

BRIEF SUMMARY

According to one aspect of the present disclosure, a data-driven big data mining and reporting system automatically identifies which data attributes to report from a first data set. The identified data attributes from the first data set is used to automatically extract additional data attributes to report from additional data sets. The identified data attributes from the first data set and the extracted data attributes from the additional data sets are reported. In one embodiment, the identifying of which data attributes to report from the first data set is performed using natural language processing. Note that a data attribute is a value or characteristic in the data set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 7 depicts a portion of a log file from an application server connected to the Internet.

FIG. 11B depicts an example input to the process of FIG. 11A.

FIG. 11C depicts an example output from the process of FIG. 11A.

FIGS. 12B-G describes nodes of the semantic tree.

FIG. 14 is a flow chart describing one embodiment of a cyk method used in the generation of a semantic tree.

DETAILED DESCRIPTION

To more quickly and easily allow Big Data to be used and/or analyzed, a data processing system is proposed that uses machine learning to automatically (without end user input) identify features of the data, thereby enabling instant and automatic creation of one or more dashboards that describe features of the data and/or automatic creation and transmission of alerts about the data in regard to anomalies and/or trends.

Figure 1:
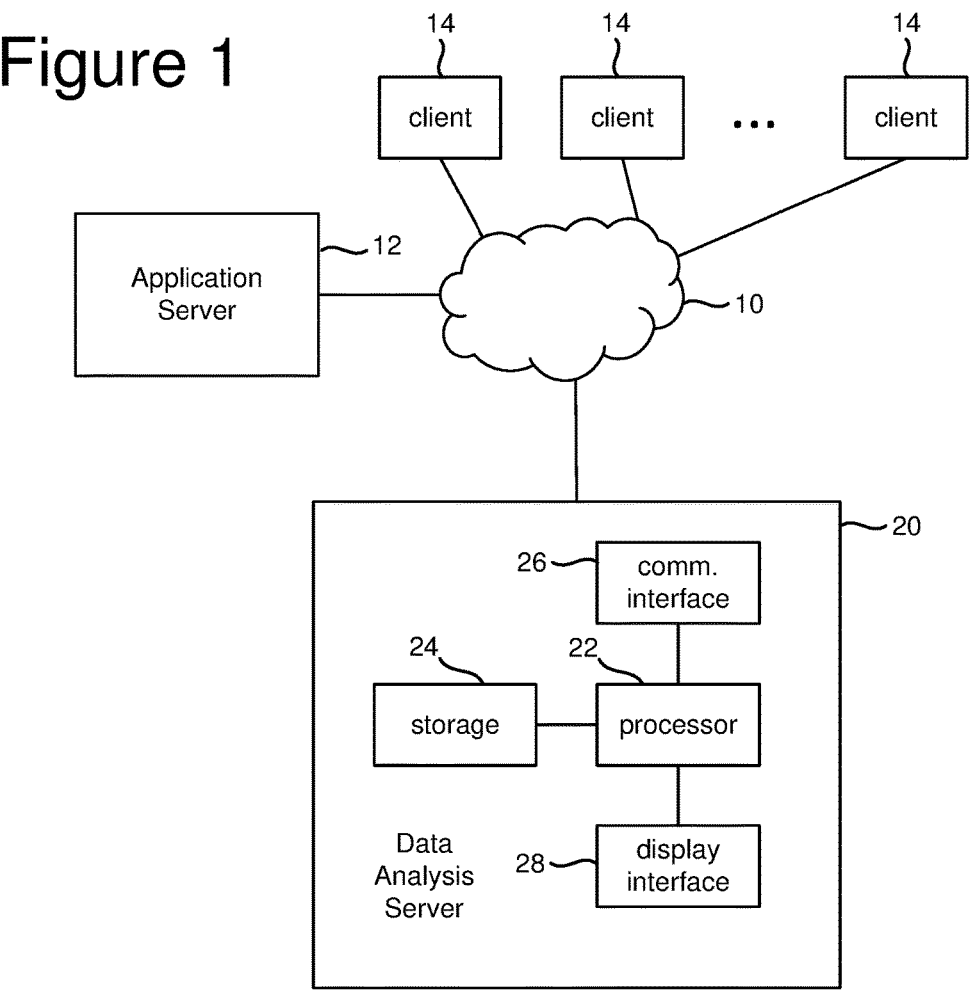
FIG. 1 Is a block diagram depicting a data processing system.

FIG. 1 is a block diagram depicting a data processing system that can implement the technology described herein. More specifically, FIG. 1 shows Application Server 12 connected to the Internet 10. In one embodiment, Application Server 12 is implementing a website such as an e-commerce site, information site, or any other type of websites. In one example embodiment, Application Server 12 can be implemented using an Apache Server or any other type of applications or web servers. Application Server 12 is in communication (via Internet 10) with a number of clients 14. In one embodiment, Application Server 12 generates one or more log files that document interaction with clients 14. In addition, log files can be generated to document other actions, states or conditions of Application Server 12. In other embodiments, Application Server 12 generate large data files in response to other monitoring, scientific, or data gathering activities. Any of these large data files can be provided from Application Server 10 (or another entity) to Data Analysis Server 20 for data analysis.

In one embodiment, the data provided to Data Analysis Server 20 from Application Server 12 can be provided using an agent. For example, an agent may monitor changing of a log file or other data file in one or more directories and push the updates to Data Analysis Server 20. In an agentless embodiment, Data Analysis Server 20 pulls data from Application Server 12 via an API associated with Application Server 12. In another alternative, the data can be streamed from Application Server 12 to Data Analysis Server 20. In yet another embodiment, a user may manually transfer a file from Application Server 12 to Data Analysis Server 20. Although in the above embodiments the data is provided to Data Analysis Server 20 from Application Server 12, in other embodiments at Data Analysis Server 20 can obtain the data from another source.

Data analysis server 20 includes a processor 22 connected to storage device 24, communication interface 26 and display interface 28. Processor 22 could include one or more microprocessors (or processors). Storage device 24 can include RAM, flash memory, other semi-conductor memory, disk drives or other storage devices. Storage device 24 can include one or multiple storage devices. Display interface 28 includes an electrical interface to any type of display device including a monitor, television, projector, head mounted display, etc. Communication interface 26 includes an electrical circuit allowing for communication to Application Server 12 (or other clients) via Internet 10 (or other networks), such as a network card, modem, communication port, etc. In one embodiment, software stored in storage device 24 is used to program processor 22 to perform the method described below on data that is also stored on storage device 24.

The data (e.g., data set) from Application Server 12 is machine generated data that tends to be voluminous, which is why it is referred to as "Big Data." Additionally, that data tends to be semi-structured. To create specific rules or software to interpret that data can be difficult and time-consuming Therefore, the technology described herein provides an automated way for accessing the data (even if the exact data format/structure is unknown) in order to determine which features are relevant and interesting to report and then reporting those features in an automated way with little or no input from the end user.

Figure 2:
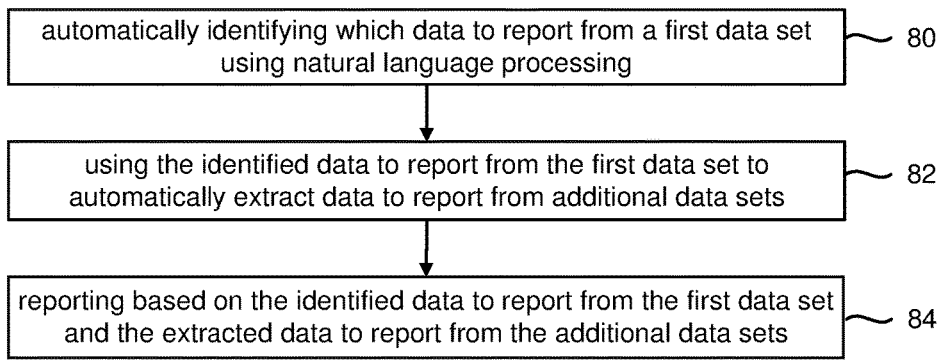
FIG. 2 is a flow chart describing one embodiment of a processor for extracting data/features from machine generated data.

FIG. 2 is a flow chart describing one embodiment of a process for automatically extracting data/features from machine-generated data. This process can also apply to data generated by humans. In one embodiment, the process in FIG. 2 is performed by processor 22 of Data Analysis Server 20 using data supplied from Application Server 12. Processor 22 is programmed by software residing in storage device 24 to perform the process of FIG. 2.

Step 80 of FIG. 2 includes automatically identifying which one or more data attributes to report from a first dataset using natural language processing. In one embodiment, the process of FIG. 2 is performed without user input. Therefore, Data Analysis Server 20 must figure out which data attribute(s) to report of the data provided from Application Server 12 without help from a user. For the data reporting to be meaningful, not all the data attributes can be reported. Data Analysis Server 20 figures out which data attributes would be most interesting to report in Step 80. Note that Step 80 is performed on a first data set. In one embodiment, the first dataset is the entire data provided at a given time to Data Analysis Server 20. In another embodiment, the first dataset is the subset of the data provided to data analysis 20. One example subset is one line of data from a log file. Other example subsets can include other portions of the data.

In one embodiment, the process of identifying which one or more data attributes to report is performed using natural language processing. Natural language processing is the ability of the computer program to understand human language, as it is spoken. Natural language processing is a component of artificial intelligence. The development of natural language processing applications is challenging because computers traditionally require humans to speak to them in programming languages that are precise, unambiguous, and highly structured or, perhaps through a limited number of predefined commands Human speech, however, is not always precise—it is often ambiguous and the linguistic structure can depend on many complex variables, including slang, regional dialects and social context. Natural language processing combines the benefit of both syntactic analysis and semantic analysis. Syntactic analysis gets at the structure grammar of the sentences. Semantic analysis deals with the meaning of words in sentences, the ways that words in sentences refer to elements in the world.

Starting with a sentence in natural language, the result of syntactic analysis will yield a syntactic representation in a grammar. Syntactic representations of language often use context-free grammars, which show what phrases or parts of other phrases in what might be considered a context-free form. In the result of semantic analysis we yield a logical form of the sentence. A logical form is used to capture semantic meaning and depict the meaning independent of any such contexts.

Just like it sounds, a context-free grammar consists of rules that apply independent of the context, whether the context of other elements or parts of the sentence or of the larger discourse context of the sentence. More details of the natural language processing utilized by Data Analysis Server 20 is described below.

In Step 82, the one or more data attributes that are identified to be reported from the first data set from Step 80 is used to automatically extract one or more data attributes to report from additional data sets. That is, using natural language processing and/or other machine learning techniques, Data Analysis Server 20 uses the first data set to figure out what data attribute(s) to report. Once it is figured out which data attributes to report, Data Analysis Server 20 uses that information to report one or more data attributes from other data sets. In Step 84, Data Analysis Server 20 will report based on the identified data attributes from the first data set and the extracted data attributes from the additional data sets. The reporting can be performed using a graphical user interface, speaker, e-mail, text message, or other means for reporting. No specific format for the reporting is required to implement the technology described herein.

Figure 3:
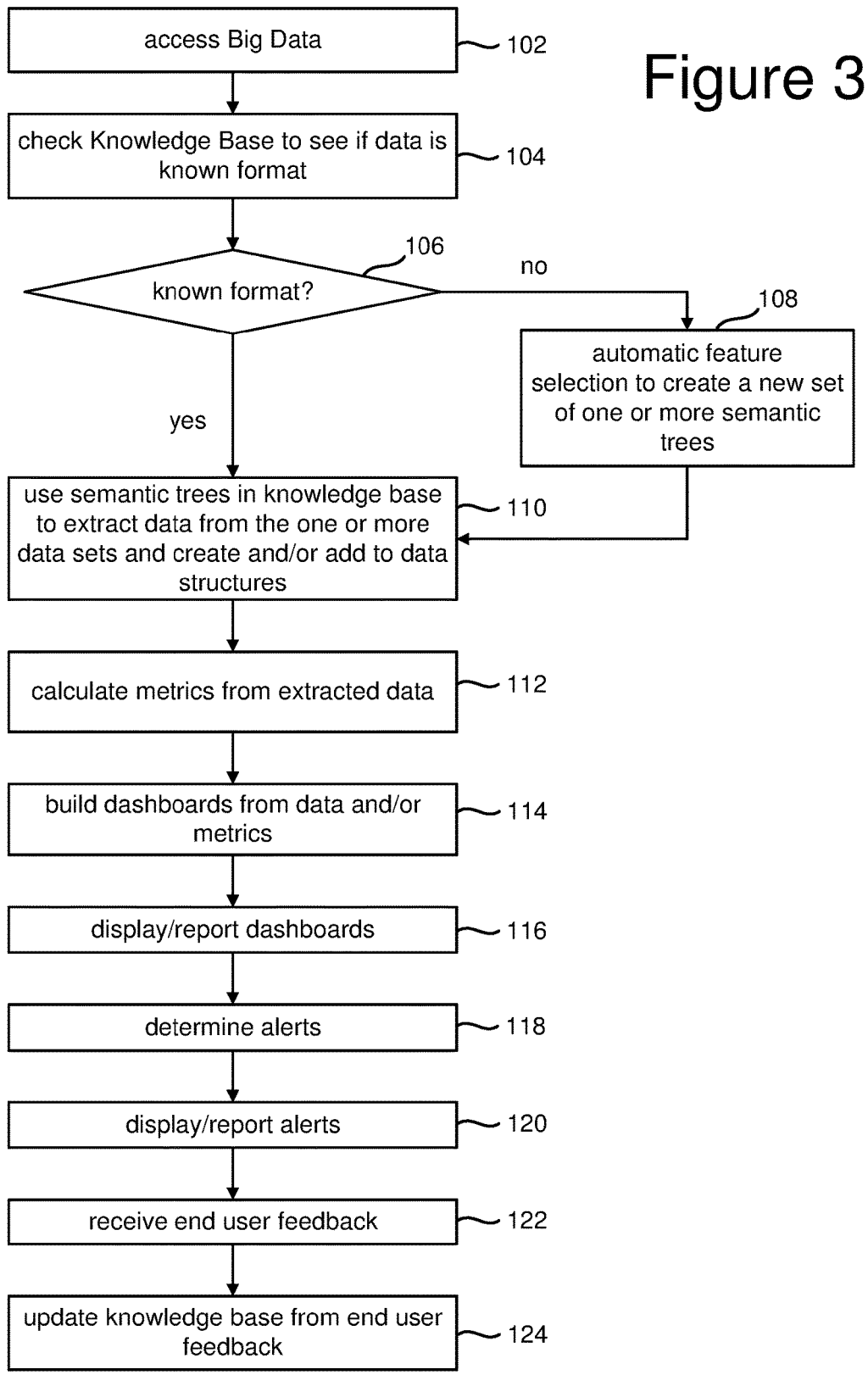
FIG. 3 is a flow chart describing one embodiment of a processor for extracting data/features from machine generated data.

FIG. 3 is a flow chart describing more details of one example implementation of the process of FIG. 2. In one embodiment, the process of FIG. 3 is performed by Data Analysis Server 20. In Step 102, Data Analysis Server 20 access Big Data. Step 102 can include accessing a single data set of the Big Data or multiple data sets of the Big Data. The Big Data can be one file or data structure or multiple files or data structures. In other embodiments, the data accessed in step 102 is data, but not necessarily big data. The technology described herein is not limited to Big Data and can be used with many different types of data (such as traditional tabular data). In Step 104, Data Analysis Server 20 checks the Knowledge Base to see if the data it has accessed in step 102 is of a known format. The Knowledge Base, which is a set of known information, will be discussed in more detail below. If the data is not in a known format (Step 106), then in Step 108 Data Analysis Server 20 performs automatic feature selection from the data in order to create a new set of one or more semantic trees (as will be discussed in more detail below). In one embodiment, the semantic trees are used to identify which data to report from the dataset. In other embodiments, other structures or formats for representing the dataset and representing which data to report from the dataset can be used. After performing the automatic feature selection (which is performed without any input from the end user or any other human), or after Step 106 if the format is known, one or more semantic trees in the Knowledge Base are used to extract data attributes from one or more data sets in order to create and/or add to any data structures for reporting in Step 110. For example, the one or more semantic trees created in Step 108 from the first data set will be used to extract data attributes from additional data sets. The extracted data attributes will then be stored in a reporting data structure. In Step 112, the Data Analysis Server calculates one or more metrics from the extracted data attributes that is in the data structures for reporting. Example metrics include averages, mean, maximum, minimum, outlier, etc. In Step 114, the Data Analysis Server 20 builds dashboards from the data and/or the metrics discussed above. The dashboards can include pie charts, bar graphs, analog data graphs, etc. No particular format for the dashboards is required. In Step 116, the dashboards are displayed on a monitor (or projector or head mounted display) or otherwise reported (e.g., printed, e-mailed, messaged, etc.). In Step 118, Data Analysis Server 20 determine alerts. Alerts can be used to identify anomalies in the data, when the data has exceeded the thresholds, or other useful information about the data. In Step 120, the alerts are displayed or otherwise reported. In Step 122, the end user (e.g., the reviewer of the dashboards and/or alerts) is provided with the opportunity to give feedback to Data Analysis Server 20. In Step 124, Data Analysis Server 20 uses the feedback to update the Knowledge Base; for example, one or more semantic trees can be changed based on the feedback from the end user.

Figure 4:
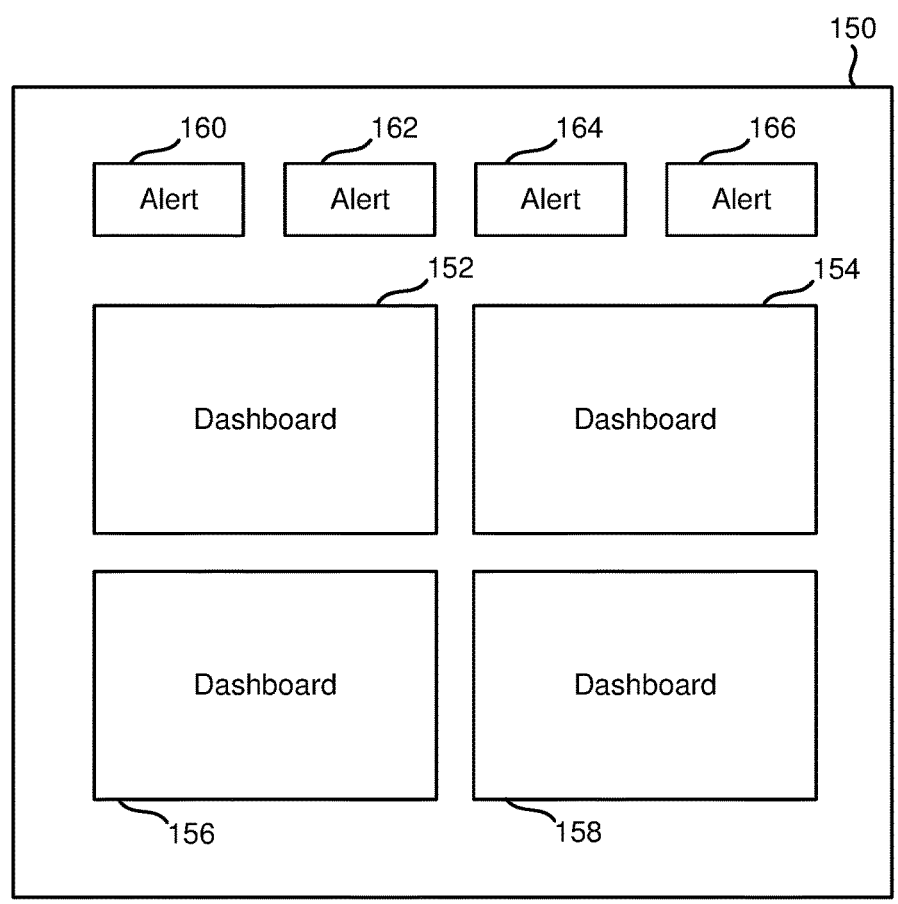
FIG. 4 depicts an example user interface.

FIG. 4 is an example of a user interface that implements the reporting of Steps 116 and 120 from FIG. 3. User interface 150 includes dashboards 152, 154, 156 and 158, as well as alerts 160, 162, 164 and 166. User interface 150 can be displayed on a monitor, television, cellular telephone, wearable (e.g. watch), head mounted display, etc.

Figure 5A:
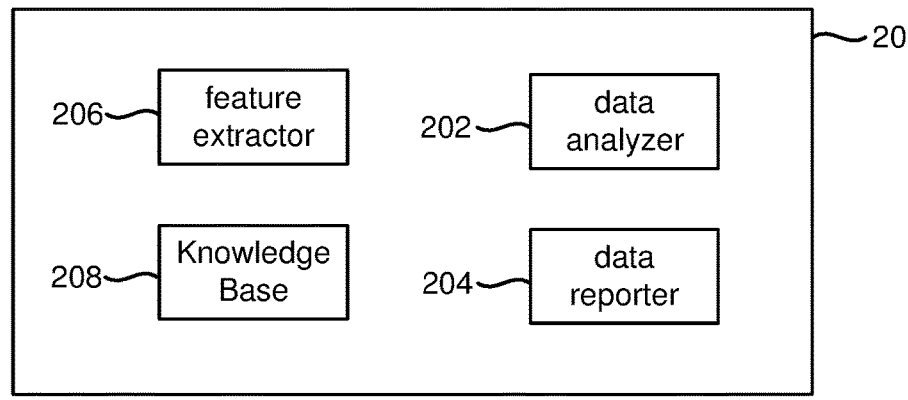
FIG. 5A is a block diagram of software components.

FIG. 5A is a block diagram describing one embodiment of an example set of software used to implement the process of FIG. 3. The software of FIG. 5A resides on Data Analysis Server 20 and, in one embodiment, is stored on storage device 24 in order to program processor 22 to perform the process of FIG. 3. The software of FIG. 5A includes data analyzer software 202, data reporter software 204, feature extractor software 206 and Knowledge Base 208. Data analyzer 202 is computer readable program code configured to perform Steps 112 and 118 of FIG. 3. Data reporter 204 is computer readable program code configured to perform Steps 114, 116, 120 and 122 of FIG. 3. Feature extractor 206 is computer readable program code configured to perform Steps 104, 106, 108 and 110 of FIG. 3. Knowledge Base 124 includes computer program code configured to perform step 124 of FIG. 3 and also manages various data used by Data Analysis Server 20, as described below. Knowledge Base 208 also includes data, as described herein. In one embodiment, Knowledge Base 208 stores regular expression patterns (e.g., YEAR:(?>\d\d)[1,2]); context free grammar statements, semantic trees and feature training sets.

Figure 5B:
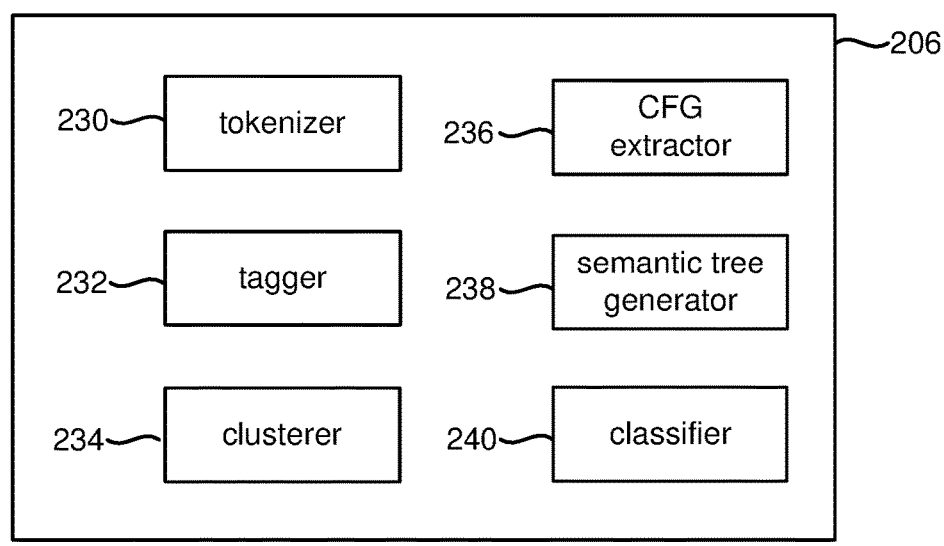
FIG. 5B is a block diagram of software components.

FIG. 5B is a block diagram describing one embodiment of the software components of feature extractor 206. For example, feature extractor 206 includes tokenizer module 230, tagger module 232, clusterer module 234, CFG extractor module 236, semantic tree generator module 238 and classifier module 240 all of which are software modules.

Tokenizer module 230 is computer readable program code configured to program processor 22 to break up a dataset into units which includes words, phrases, symbols or other meaningful elements. These units, also called tokens, are used for downstream processing, as described below. Tagger 232 is computer readable program code configured to program processor 22 to map between the tokens and parts of speech tags from Knowledge Base 208. Clusterer 234 is computer readable program code configured to program processor 22 to group the list of tags that are identical or extremely similar, so that downstream processing will only need to be applied once to each class. This will improve performance. CFG extractor 236 is computer readable program code configured to create context free grammar statements from the clustered tags. Semantic tree generator 238 is computer readable program code configured to program processor 22 to generate semantic trees based on the context free grammar statements, parts of speech tags, and the raw data files. Classifier 240 is computer readable program code configured to program processor 22 to classify the various types of data as important to report or not important to report. In one embodiment the classification is zero (do not report) or one (report). In other embodiments the classification can be a scale from zero to ten or zero to 1 (or a different scale which indicates degrees of importance). More detail about each of the components of feature extractor software 206 are provided below.

Figure 6:
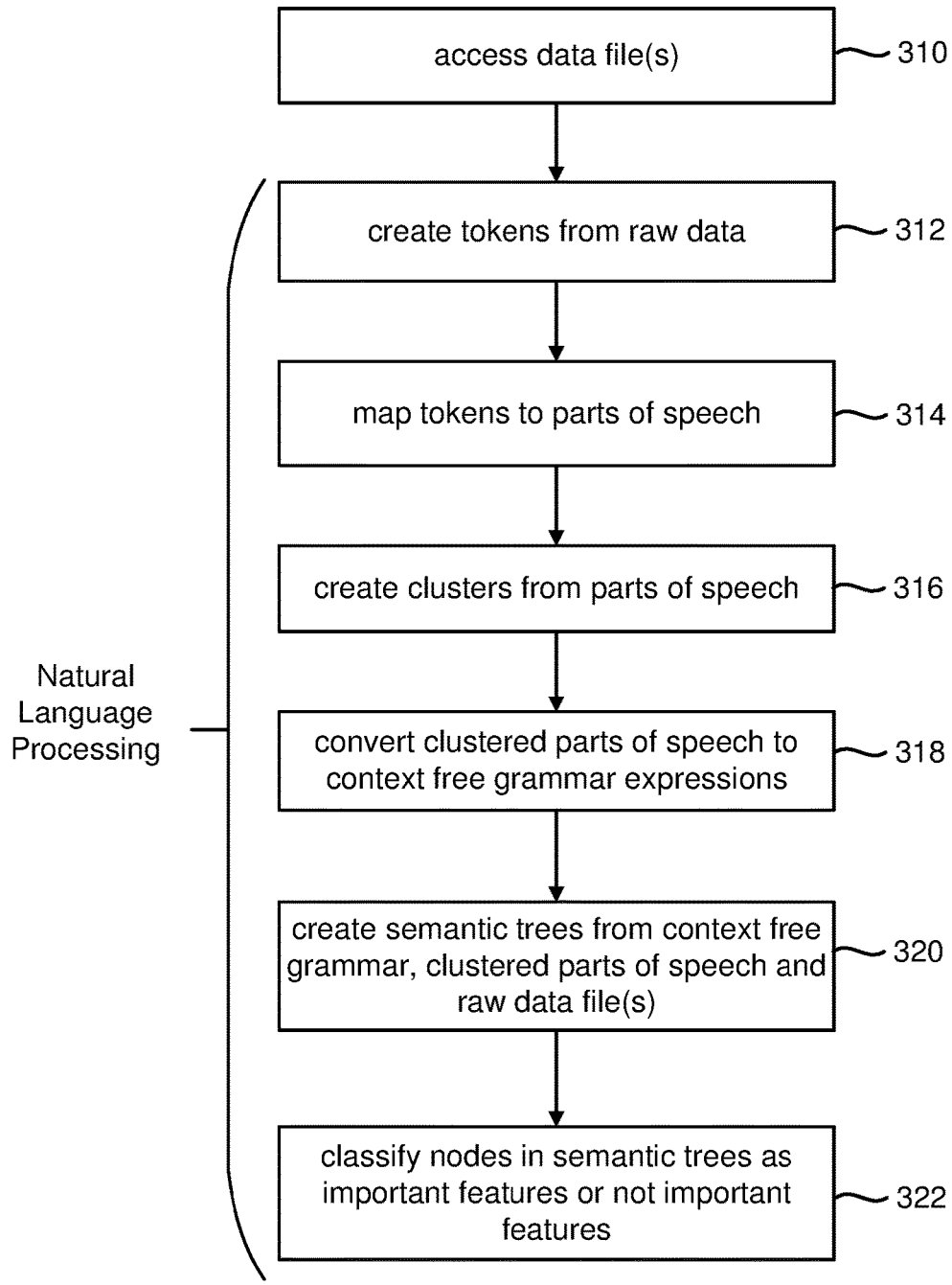
FIG. 6 is a flow chart describing one embodiment of a processor for extracting data/features from machine generated data.

FIG. 6 is a flow chart describing one embodiment of a process for performing automatic feature selection to create a new set of one or more semantic trees. That is, the process of FIG. 6 is one example implementation of step 108 of FIG. 3. The process of FIG. 6 is performed by feature extractor 206 using the software modules depicted in FIG. 5B. In Step 310 of FIG. 6, Data Analysis Server 20 accesses one or more data files (or a stream of data). In one example embodiment, the accessed data file is a log file from an Apache Web server. FIG. 7 depicts a portion of an example log file LF which can be used in conjunction with the technology described herein. In Step 312, tokenizer 230 is used to create a set of tokens from a portion (e.g., one line) of raw data found in log file LF. In Step 314, each token is mapped to a part of speech by tagger 232. The output of Step 314 is a set of lists, where each list includes a set of tags. Each tag includes a part of speech. In Step 316, clusterer 234 is used to cluster the list(s) of parts of speech or list(s) of tags. In Step 318 the clustered parts of speech are used to create context free grammar expressions by CFG extractor 236. In Step 320, semantic trees are created from the context free grammar expression, clustered parts of speech and the raw data files by semantic tree generator 238. In Step 322, classifier 240 is used to classify the nodes of the semantic trees as important features to be reported or non-important features that do not need to be reported. In one embodiment, Steps 320 and 322 include creating a data structure representation for a set of data that includes a plurality of nodes, with each node representing a portion of the dataset and comparing type of node, length of node, content of nodes and neighboring nodes to historical data in order to classify the nodes. Steps 312-322 are examples of natural language processing. Therefore, the process of FIG. 6 (Step 108 of FIG. 3) includes natural language processing.

Figure 8A:
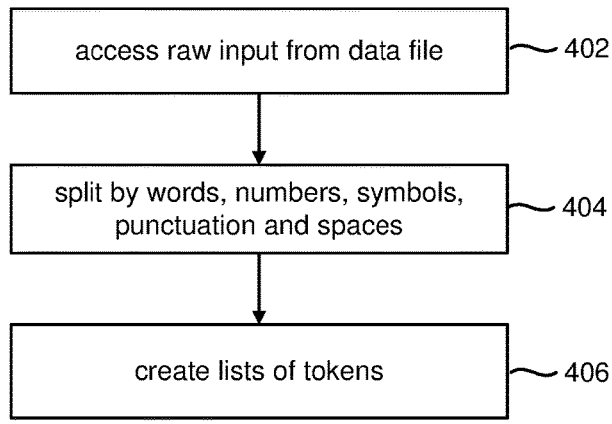
FIG. 8A is a flow chart describing one embodiment of a processor for tokenizing a data set.
Figure 8B:
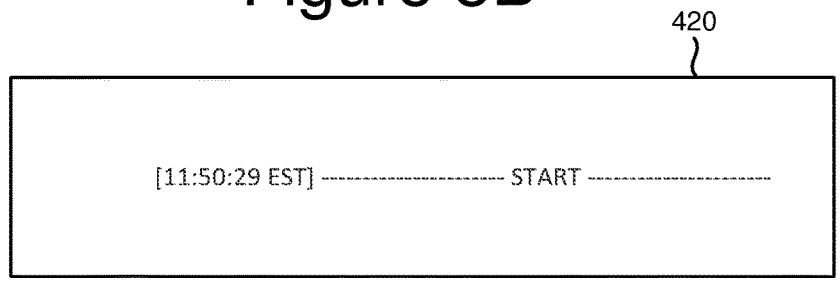
FIG. 8B depicts an example input to the process of FIG. 8A.
Figure 8C:
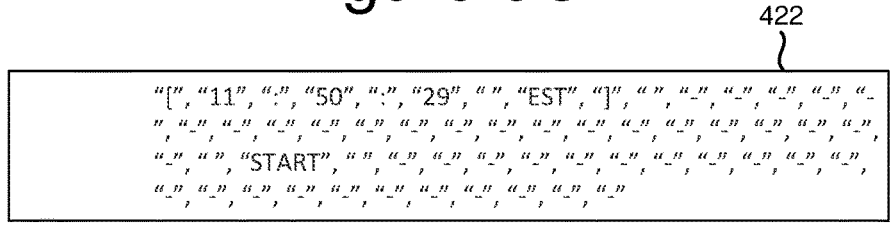
FIG. 8C depicts an example output from the process of FIG. 8A.

FIG. 8A is a flow chart describing one embodiment of a process for creating tokens from raw data. For example, the process of FIG. 8A is one example implementation of Step 312 of FIG. 6. Step 402 includes accessing the raw input from a data file. In one embodiment, Step 402 includes accessing one line of raw data from a data file (or other structure). FIG. 8B provides one example of a line of raw input data 420 from a data file such as log file LF of FIG. 7. Step 404 includes breaking up the raw data into units, with each unit being referred to as a token. For example, Step 404 includes splitting the raw data accessed in Step 402 by words, numbers, symbols, punctuation and spaces. Step 406 includes creating a list of all the tokens from Step 404 and storing that list in storage device 24 (or other storage device). FIG. 8C provides an example list of tokens 422 created from the raw input data 420 of FIG. 4B using the process of FIG. 8A.

Figure 9A:
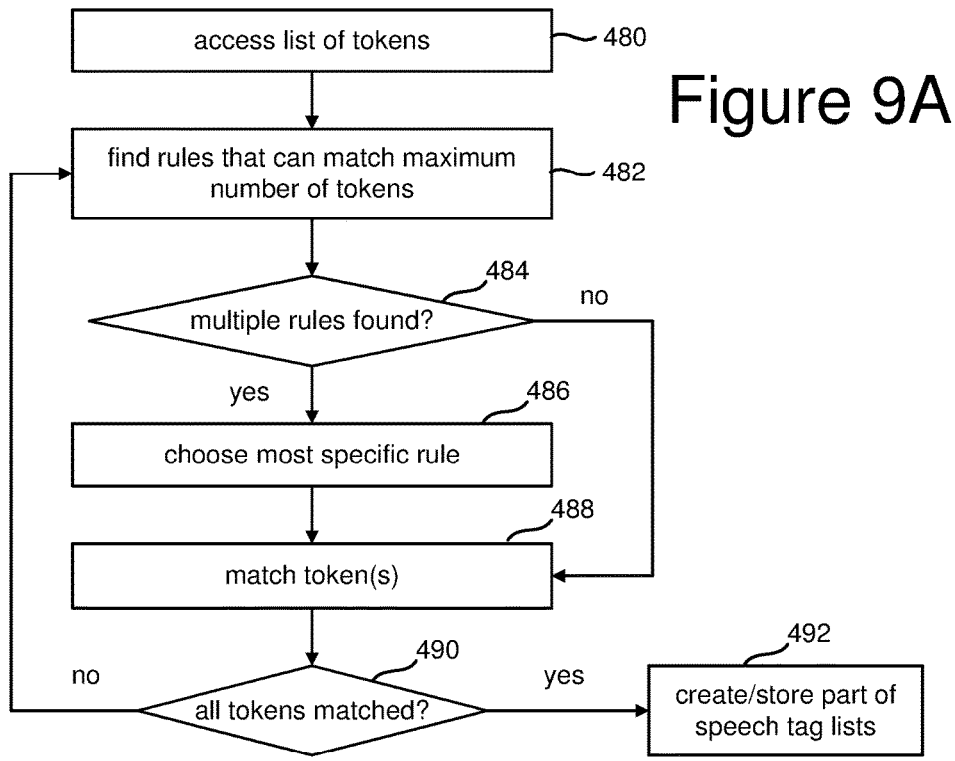
FIG. 9A is a flow chart describing one embodiment of a processor for tagging a data set with parts of speech.

FIG. 9A is a flow chart describing one embodiment of a process for mapping tokens to parts of speech. That is, the process of FIG. 9A is one example embodiment of Step 314 of FIG. 6. A part of speech is a category of words which have similar grammatical properties. Tokens or a sequence of tokens are assigned to different parts of speech based on regular expression patters they match in this process. In one embodiment, Data Analysis Server 20 will use the rule of maximal munch and minimum range to automatically tag the tokens.

The parts of speech used for the mapping are stored in rules in Knowledge Base 208. In one embodiment, the rules also contain information about whether a part of speech is an important feature. An example rule is "data:F (?:/S*)" where F means not an important feature ant T means is an important feature that needs to be reported. Note that (?:/S*) is a regular expression. Knowledge Base 208 includes a list of tags and regular expressions that describe the structure of the data. If Data Analysis Server 20 finds a new string that is not in the Knowledge Base, Data Analysis Server 20 can assign a random name and create a new regular expression. A user can later update the Knowledge Base during Steps 122-124 of FIG. 3.

Figure 9B:
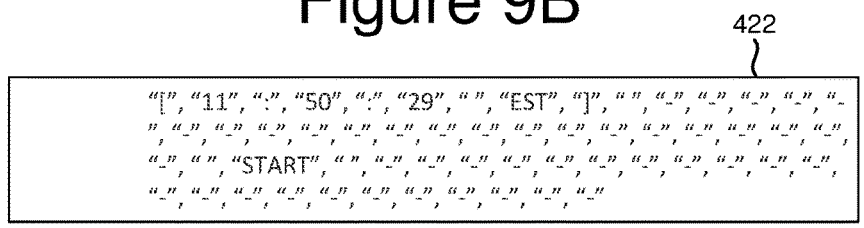
FIG. 9B depicts an example input to the process of FIG. 9A.
Figure 9C:
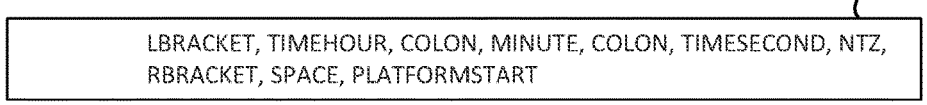
FIG. 9C depicts an example output from the process of FIG. 9A.

In Step 480, Data Analysis Server 20 accesses a list of tokens. FIG. 9B provides an example list of tokens 422 that serves as the input to the process of FIG. 9A. In Step 482, Data Analysis Server 20 finds rules that can match the maximum number of tokens. In Step 484, it is determined whether multiple rules were found. If so, then the most specific rule is chosen in Step 486. In Step 488, the token is matched to the rule. If, in Step 484, multiple rules were not found, the process would skip Step 486 and proceed directly to Step 488 and match the token. In Step 490, it is determined whether all tokens of the list of tokens that served as the input to the process have been matched. If not, the process loops back to Step 482. If all tokens have been matched, then in Step 492 Data Analysis Server 20 creates and store the part of speech tag lists. FIG. 9C depicts an example part of speech tag list 424 that is the output of the process of FIG. 9A. Each of the tags in the list of FIG. 9C are the "data" from an example rule (see above example rule). As can be seen, the process of FIG. 9A converts the data units into parts of speech.

Figure 10A:
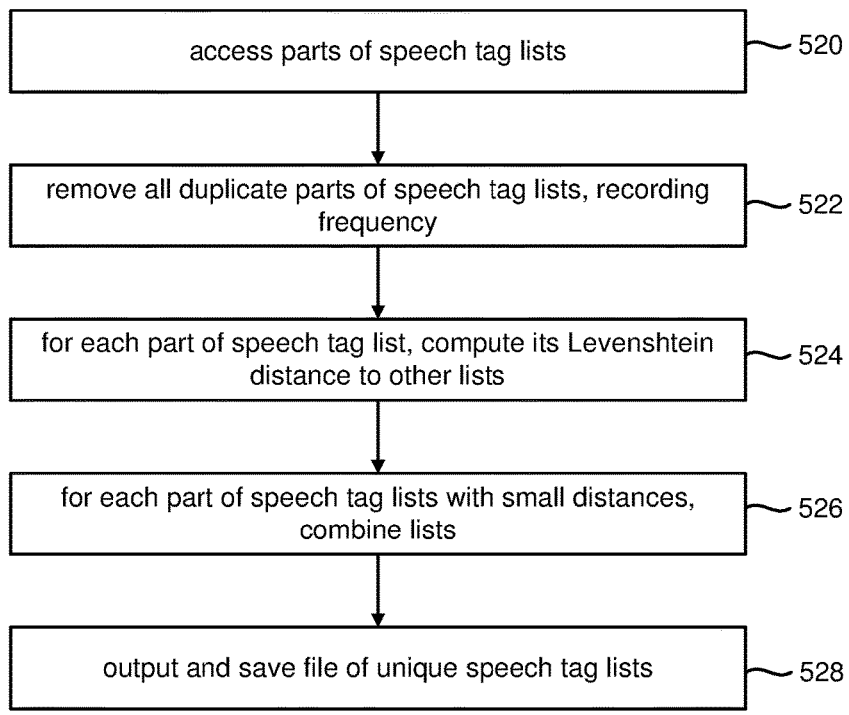
FIG. 10A is a flow chart describing one embodiment of a processor for clustering.

FIG. 10A is a flow chart describing one embodiment of creating clusters from the lists of speech tags. In one embodiment, this process uses an optimized agglomerative hierarchical clustering algorithm to group each line of input into different classes so that downstream processes will only need to be applied once to each class. Such processing will improve performance Put in other words, the process of clustering will combine lists of speech tags that are identical or lists of speech tags that are very similar. The process of FIG. 10A is one example embodiment of Step 316 of FIG. 6.

Figure 10B:
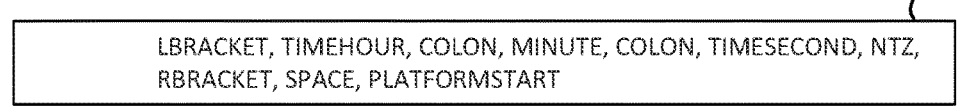
FIG. 10B depicts an example input to the process of FIG. 10A.
Figure 10C:
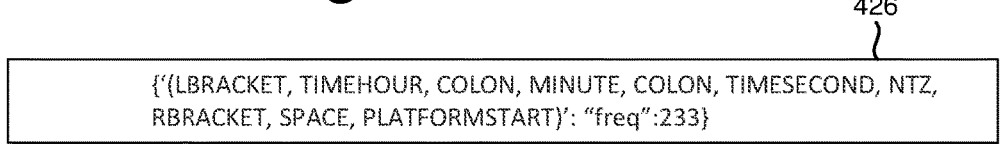
FIG. 10C depicts an example output from the process of FIG. 10A.

In Step 520 of FIG. 10A, Data Analysis Server 20 accesses one or more lists of parts of speech. FIG. 10B provides an example list of parts of speech 424. In Step 522, Data Analysis Server 20 removes all duplicate parts of speech tag lists and records the frequency of each duplicate. For example, if there are five duplicate parts of speech tag lists, four of them will be deleted and the variable five will be saved in association with the one tag list that was not deleted. For each part of speech tag list, Data Analysis Server 20 will compute its Levenshtein distance to other lists. In Step 526, for each part of speech tag lists with small Levenshtein distances, the list will be combined. In Step 528, Data Analysis Server 20 will output and save a file of unique speech tag lists. FIG. 10C provides an example clustered unique speech tag list 426 which indicates that this tag list has showed up in the initial dataset 233 times.

Figure 11A:
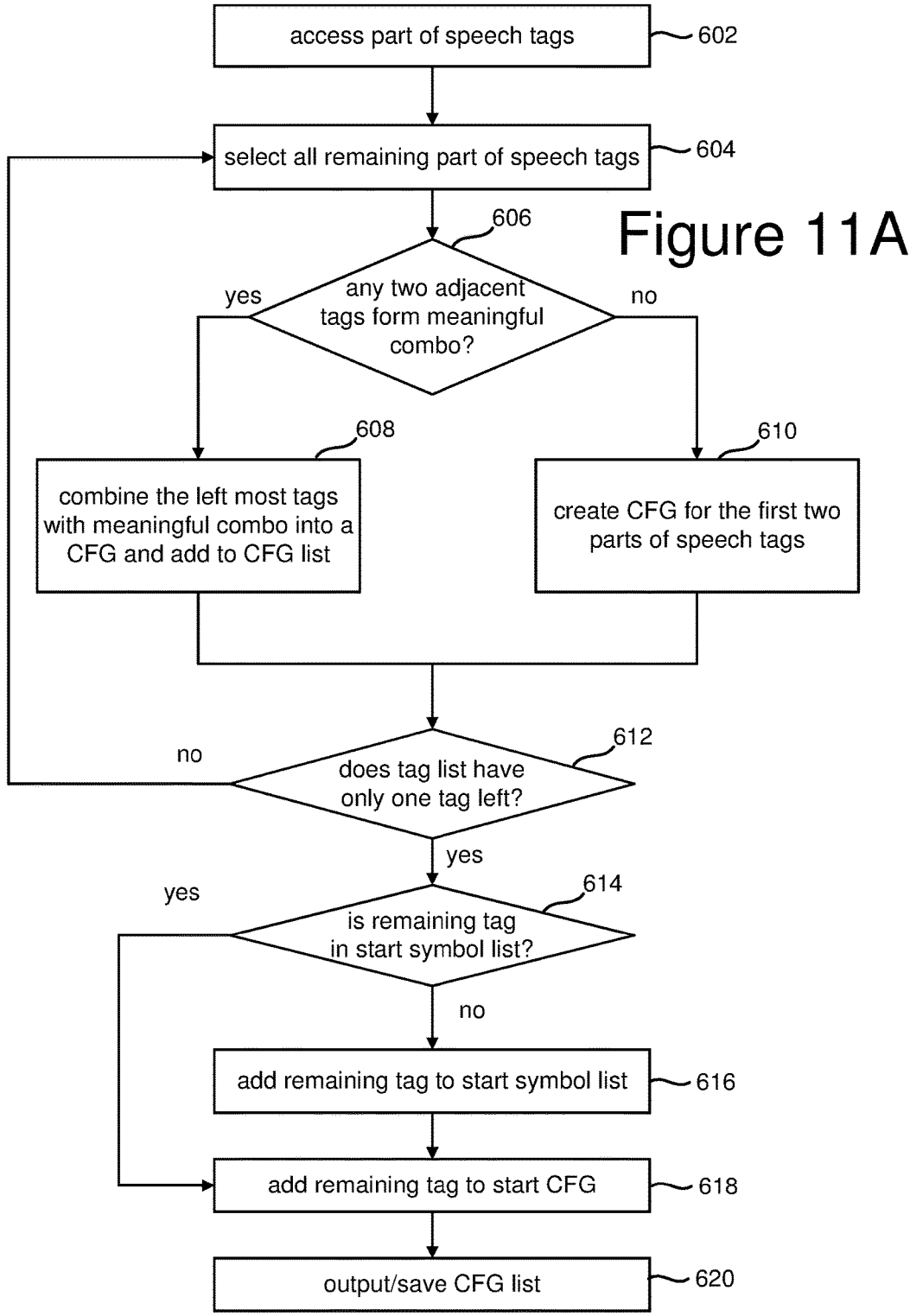
FIG. 11A is a flow chart describing one embodiment of a processor for creating context free grammar.

FIG. 11A is a flow chart depicting one example process for converting clustered parts of speech lists to context free grammar expressions. The process of FIG. 11A is an example embodiment of Step 318 of FIG. 6. A context free grammar expression is a formal grammar expression which a production rule is in the form V→w, where V is a single non-terminal symbol and w is a string of terminals and/or non-terminals. In one embodiment, there is a set of initial context free grammar expressions stored in Knowledge Base 208. As Data Analysis Server 20 runs, new context free grammar expressions will be automatically generated. Additionally, users can always add new context free expressions into Knowledge Base 208 (see Steps 122-124 of FIG. 3). In one example embodiment, context free grammar extractor 236 performs a naïve method that is heuristic based, assuming a log is from left to right, using key word combinations. For example, "1.1.1.1 GET 'HTTP://www.ca.com'" will result in a part of speech tag sequence of "ip, Verb, url." If there are no context free grammar expressions already in Knowledge Base 208, the new context free expressions can be created, such as: "NewField1→IP verb" and "Start-→NewField1 URL" will be added to the set of context free expressions so that the line can be represented.

In Step 602 of FIG. 11A, Data Analysis Server 20 accesses a list of parts of speech tags. For example, FIG. 11B provides an example list of parts of speech tags which can be the input to the process of FIG. 11A. In Step 604, Data Analysis Server 20 selects all remaining parts of speech tags. If this is the first time Step 604 is being performed, then all tags will be remaining. In Step 606, Data Analysis Server 20 determines whether any two adjacent tags form a meaningful combination. Examples of adjacent tags that form a meaningful combination include TIMEHOUR and COLON because they are part of a time stamp. If Data Analysis Server 20 finds any two adjacent tags that form a meaningful combination, then Step 608 is performed. If no adjacent tags form a meaningful combination, then Step 610 is performed. After Step 608 or Step 610, the process continues to Step 612. In Step 608, Data Analysis Server 20 combines the left most tags that form meaningful combinations into a context free grammar expression and then adds that context free grammar expression to the list of context free grammar expressions being created. In Step 610 (no two adjacent tags form meaningful combinations), Data Analysis Server 20 creates a context free grammar expression for the first two parts of speech tags. In Step 612, Data Analysis Server 20 determines whether the tag list has only one tag left to process. If not, the process loops back to Step 604. If there is only one tag left to process, then in Step 614, Data Analysis Server 20 determines whether the remaining tag is in the start symbol list, which is a list of start symbols stored in Knowledge Base 208. If not, the remaining tag is added to the start symbol list in Step 616. In Step 618 (after adding symbol to start symbol list or if remaining tag is already in start symbol list), the remaining tag is used to create a "start" context free grammar expression. In Step 620, the list of context free grammar expressions, stored in a structure, is output and saved in Knowledge Base 208. FIG. 11C is an example output context free grammar list in a structure (between brackets) that is the output of Step 620.

Figure 12A:
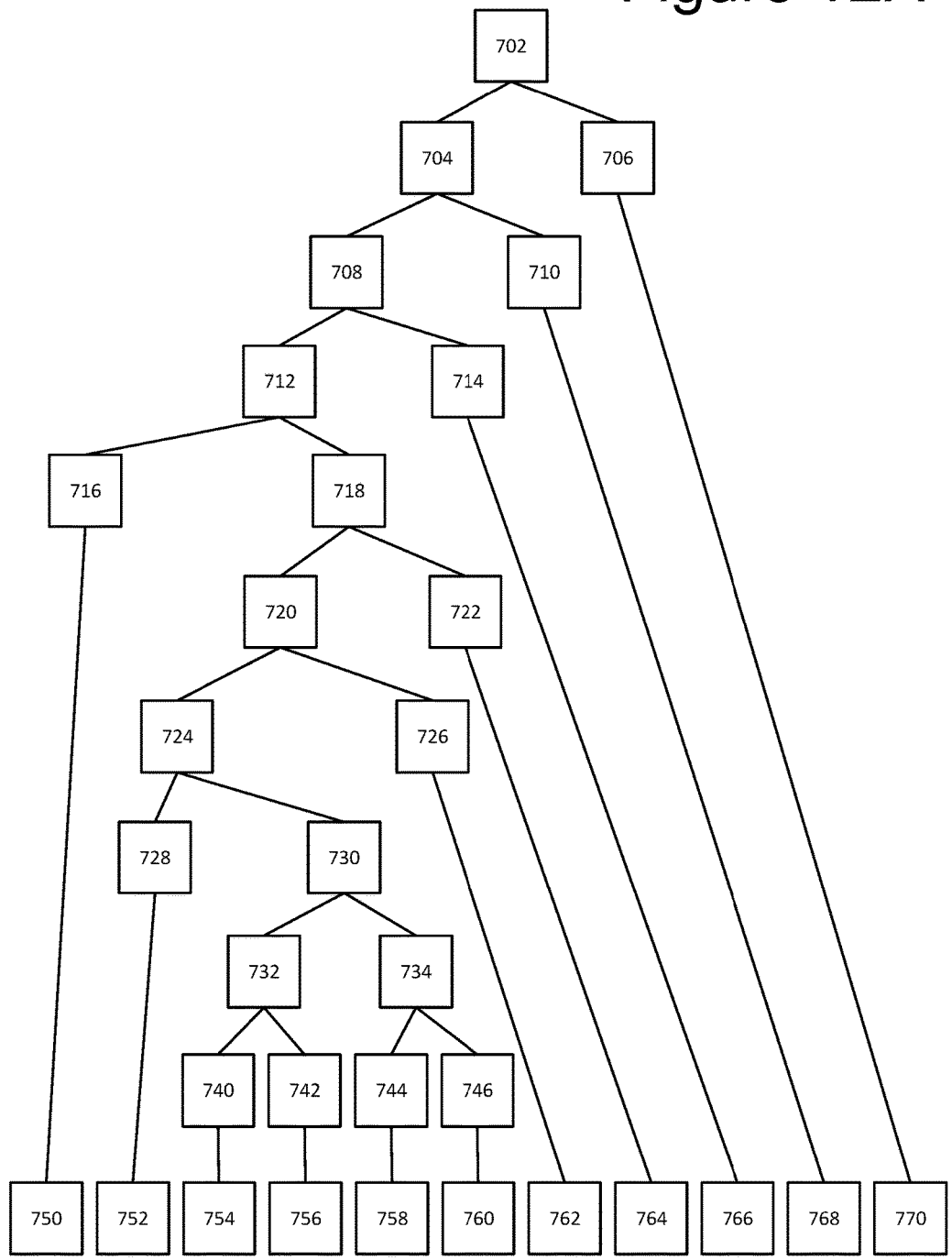
FIG. 12A depicts a semantic tree.

Looking back at FIG. 6, Step 320 includes creating one or more semantic trees. FIG. 12A depicts an example semantic tree for the first line of the log LF depicted in FIG. 7, that also correlates to FIGS. 8B, 8C, 9B, 9C, 10B, 10C, 11B and 11C. The semantic tree of FIG. 12A includes nodes 702, 704, 706, 708, 710, 712, 714, 716, 718, 720, 722, 724, 726, 728, 730, 732, 734, 740, 742, 744, 746, 750, 752, 754, 756, 758, 760, 762, 764, 766, 768 and 770. Node 702 is known as the root node. Nodes 750-770 are leaf nodes. Nodes 704-746 are intermediate nodes. FIG. 12B shows the details of a node other than a leaf node (i.e. root node or intermediate node). In one embodiment, each such node includes seven fields. However, in other embodiments more or less than seven fields can be used. The field "Is_feature" indicates whether the node represents a feature that is to be reported or the node represents a feature that is not to be reported. "Node_ID" is a globally unique identification. The field "Node_name" is optionally used to indicate whether this particular node has a name in Knowledge Base 208 as it displays the name if it has a name in Knowledge Base 208 and display nothing if not. The field "Node_type" indicates a type of node stored in Knowledge Base 208. The field "Node_range" indicates the range of units or tokens in the raw data represented by this node. The field "Node_rank" stores the rank (importance) of a feature (e.g., 0-1. 1-10, 1-100, etc.). In one embodiment, the bigger the number the more important the feature is. In one embodiment, "Node_rank" is not used because the system only decides whether a node is an important feature or not. The field "Split" indicates the place in the raw data string where the node is divided into its left child and its right child. This is used for a quick lookup (binary search). For example, root node 702 has a split of 15. That means that its left child node 704 starts from position zero (left border of the root node) until the position 14 so the string corresponding to the left child is the first 15 characters of the input string (e.g., "[11:50:29 EST]"). Its right child starts from position 15 and goes to the end of the string (e.g., "---------------------- START ----------------------").

FIG. 12C depicts the details of a leaf node. In one embodiment, the leaf node includes four data fields. The field "Node_ID" is a globally unique identification. The field "Regular_pattern" is the regular expression from Knowledge Base 208 that was recognized when mapping tokens to parts of speech. "Node_range" indicates the range of units or tokens in the raw data represented by this node. "Node_string" is the actual characters from the raw data file that correspond to this node.

FIG. 12D provides an example of the contents of root node 702. FIG. 12E provides the contents of example node 712. FIG. 12F provides examples of contents of node 718. As can be seen, node 718 has "True" for the "Is_feature" data field, indicating that node 718 represents data that will be reported. FIG. 12G provides an example of leaf node 756 corresponding to the string "50" found in the first line of the log file LF of FIG. 7.

Figure 13:
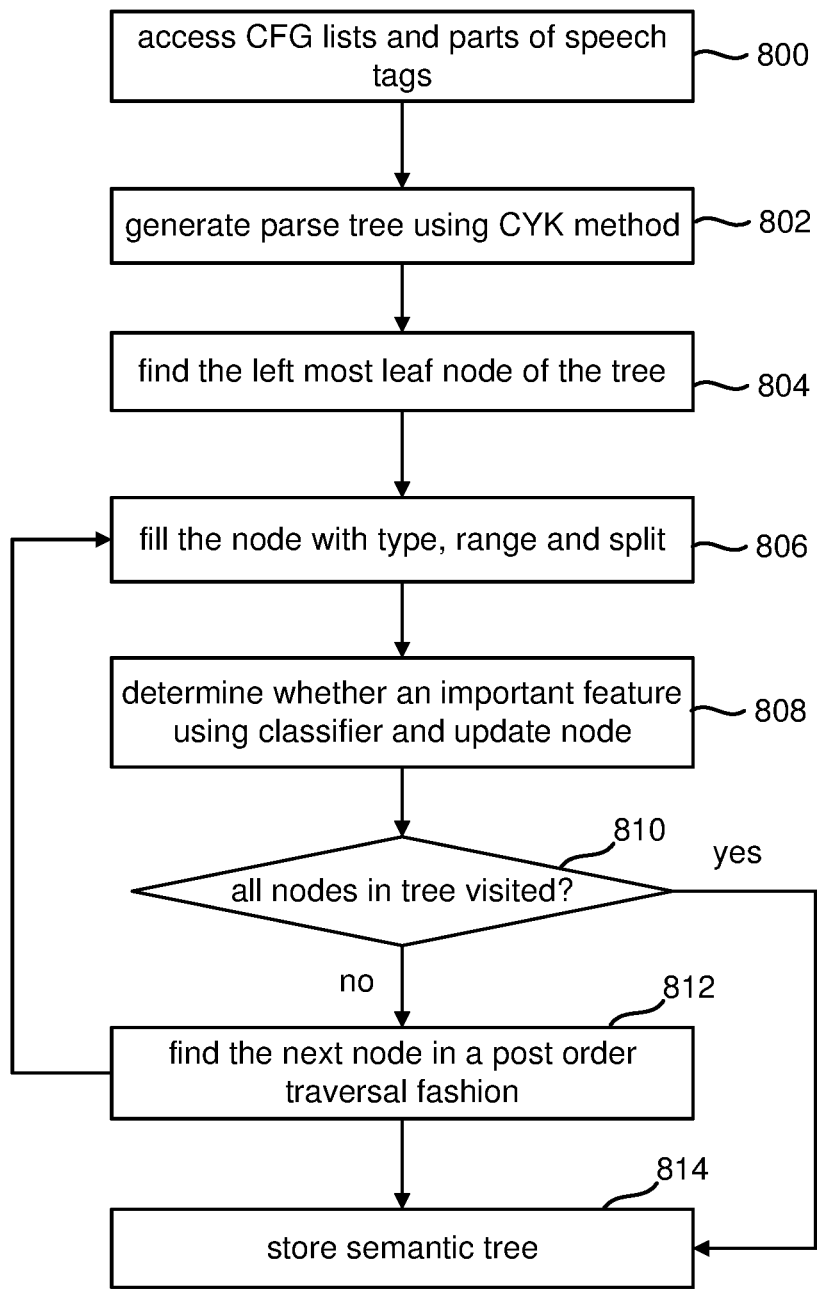
FIG. 13 is a flow chart describing one embodiment of a processor for generating a semantic tree.

FIG. 13 is a flow chart describing one embodiment of a process of creating semantic trees from context free grammar expressions, cluster parts of speech, and raw data files. The process of FIG. 13 is one example implementation of Step 320 in FIG. 6. In one embodiment, the process of FIG. 13 uses the Cocke-Younger-Kasami algorithm to generate a tree structure. In other embodiments, other algorithms can be used. In Step 800, Data Analysis Server 20 accesses the context free grammar list and parts of speech tags. In Step 802, Data Analysis Server 20 generates a parse tree using a CYK method. More details of the CYK method are discussed below. In Step 804, Data Analysis Server 20 finds the left most node of the generated parse tree from Step 802. In Step 806, the node found in Step 804 is filled with node-type range and split information. In other embodiments, other data is also added as per FIGS. 11B-11G. In Step 808, Data Analysis Server 20 determines whether the node represents an important feature using the classifier (discussed below). The node is updated accordingly. In some embodiments, a node is determined to be an important feature based on the patterns used to create the parts of speech in Step 314 in FIG. 6 (discussed above). In Step 810, Data Analysis Server 20 determines whether all nodes in the tree (from Step 802) have been visited. If so, the result is a semantic tree that is stored in Step 814 as part of Knowledge Base 208. If all nodes have not been visited in Step 812, Data Analysis Server 20 finds the next node in a post-order traversal fashion and moves back to Step 806.

FIG. 14 is a flow chart describing one embodiment of generating the parse tree using a CYK method. That is, FIG. 14 is an example implementation of Step 802 of FIG. 13. In Step 850, the process begins by letting the input be a string S consisting of n Part of Speech tags: $A_1 \ldots A_n$. In Step 852, let the grammar contain r non-terminal symbols R1 ... Rr. In Step 854, the grammar contains the subset Rs, which is the set of Start symbols. In Step 856, let P[n, n, r] be an array of booleans. Initialize all elements of P to false. In Step 858, i=0. In Step 860, Set[1, i, ai]=True. In Step 862, i=i+1. In Step 864, the system determines whether i<=n. If so, the process moves back to Step 860. If not, the process continues to Step 866 and i=2. In Step 868, j=1. In Step 870, k=1. In Step 872, P[k, j, $R_B$]==True, P[i-k, J+k, $R_C$]==True, and RA→RBRC. If so, the process loops to Step 874, otherwise the process continues to Step 876. In Step 874, P[i, j, RA]=True. The system also records backpointer, RA→RBRC and i, j, k. In Step 876, k=k+1. In Step 878, it is determined whether K≤i-1. If so, the process loops back to Step 872 and if not the process continues to Step 880 setting j=j+1. In Step 882, it is determined whether j≤n-i+1. If so, the process loops back to Step 870; otherwise, the process continues to Step 884 and i is set to equal i+1. In Step 886 it is determined whether i≤n. If so, the process loops back to Step 868; otherwise, the process continues to Step 888 and is determined if any of P[n, 1, x] is true and x is in the start list. If so, then in step 890, Data Analysis Server 20 constructs the parse tree using the back pointers.

Figure 15A:
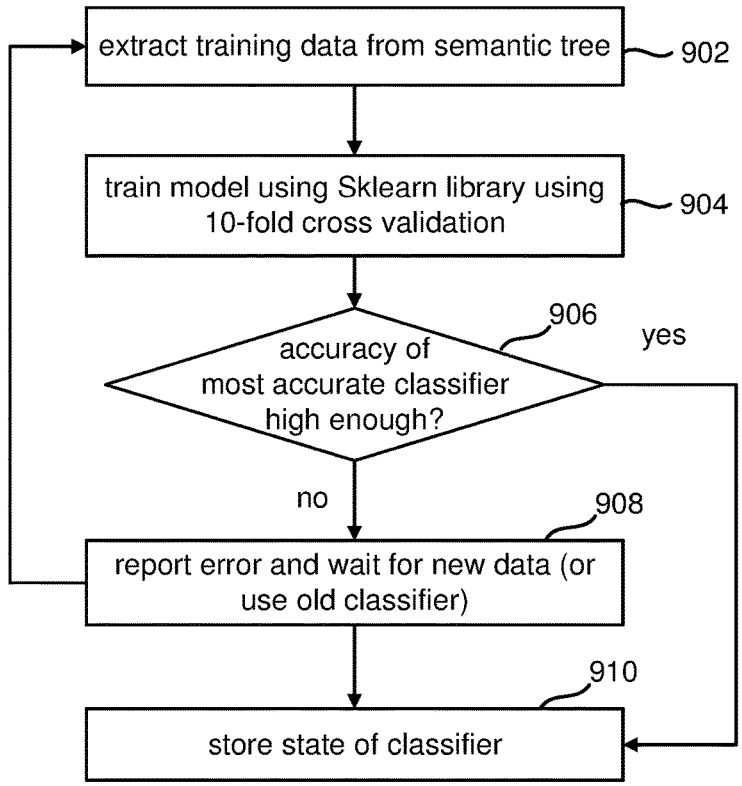
FIG. 15A is a flow chart describing one embodiment of a processor for creating or updating a classifier.
Figure 15B:
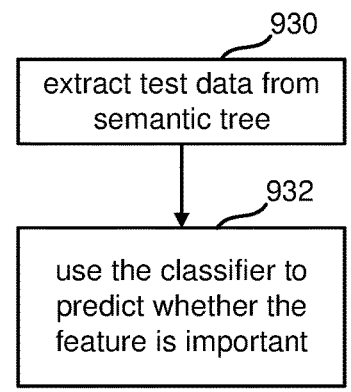
FIG. 15B is a flow chart describing one embodiment of a processor for using a classifier.

Step 808 of FIG. 13 includes determining whether a feature is important and should be reported and is not important and should not be reported. This process is performed by classifier 240. Similarly, Step 322 of FIG. 6 includes a classifier classifying nodes in a semantic tree as important features that should be reported or as not important features that do not need to be reported. FIG. 15A is a flow chart describing one embodiment for creating or otherwise updating classifier 240. FIG. 15B is a flow chart describing one embodiment for using classifier 234 (e.g. in Step 322 or Step 808).

In Step 902 of FIG. 15A, Data Analysis Server 20 will extract training data from the semantic tree 902. In one embodiment, the semantic tree will include data used to train classifier 240. In other embodiments, the training data can be stored elsewhere in Knowledge Base 208. In Step 904, classifier 240 will train a model using a Sklearn library with ten-fold cross validation. In Step 906, it is determined whether the accuracy of the most accurate classifier is high enough. If not, the error is reported and Data Analysis Server 20 waits for new data when creating the classifier in Step 908. If the process of FIG. 15A is used to update the classifier, then in Step 908 Data Analysis Server 20 will use the old classifier. After Step 908, the process can move back to Step 902. If in Step 906, it is determined that the accuracy of the most accurate classifier is high enough, then the process continues to Step 910, which includes storing the current state of the classifier.

One embodiment uses a support vector machine a machine learning library from sklearn) base classifier to decide whether each node is an important feature to be reported. In one example embodiment, four sets of data can be used to make this determination: (1) type of node (number, string or date, etc.); (2) the length of the node and position of the node; (3) sibling nodes (whether the left adjacent node or the right adjacent node is a feature to be reported); and (4) parts of speech tags. In addition, a user can directly set whether feature is important or not in Step 122 of FIG. 3, which is optional.

The training data contains two kinds of information. One is called the feature vector, which describes the character of the data point. For example, consider a node which is a data node having a length of ten and its left sibling is an important feature, and its right sibling is not. In one embodiment, the feature vector will look like (date, ten, true, false) and the feature space will be four dimensional. The other part is a label. Only training data will have this kind of information because it is known data. The label can either be true or false depending on whether it is an important feature that should be reported. The test data will have the feature vector, but the label is missing and that is what the classifier wants to find out.

Figure 16:
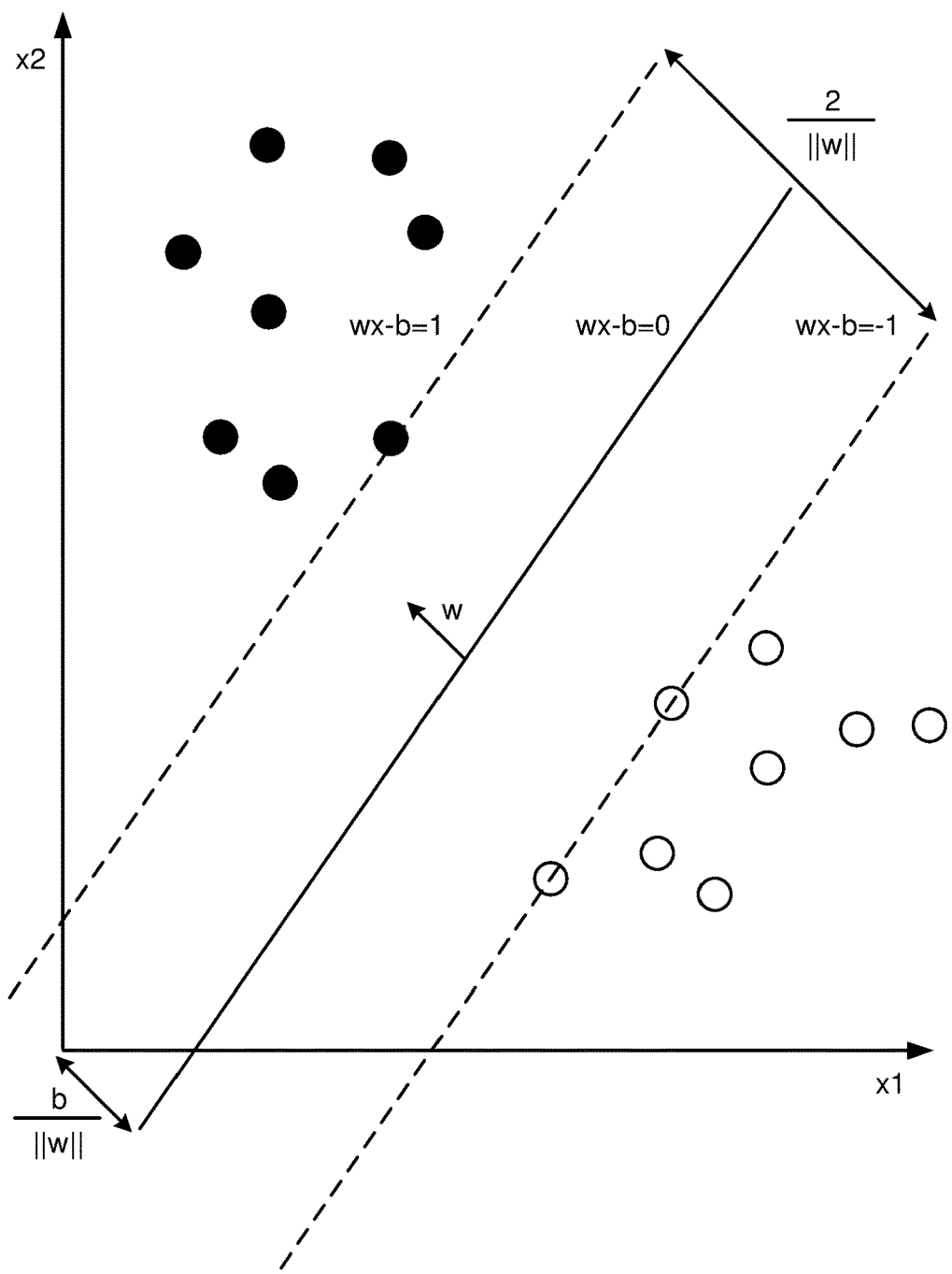
FIG. 16 is a graph of data attributes for classifying features.

The main idea of a linear support vector machine classifier is as shown in FIG. 16. If each data entry X contains two numerical features $(X_1, X_2)$ and a Boolean label Y, all of the data that is labeled with true is colored black and the false data are white points (hollow). In order to figure out a way to find the label of a new data, Data Analysis Server 20 will have the final decision boundary which if one data point falls on one side of the boundary (left and up in the figure) it will be labeled as true, and labeled as false if it is on the other side. Because the farther away one node is from the decision boundary, the more likely that the label is correct. So the process of building a support vector machine model is the process of finding out the boundary (the line wx−b=0 in the FIG. 16), which has the biggest margin which is the width that boundary could be increased by before hitting a data point. After that, the boundary will split the whole figure space into two parts and the label of a data point is determined by the part it is in.

If the training data is not linearly separable, then there is a technique called kernel trick which will map the feature vector into a higher dimensional space where it might become linear separable and then mapped back. If the kernel used is a Gaussian radial basis function, the corresponding feature space is a Hilbert space of infinite dimension. The higher the dimension is more likely to be linearly separable and will increase the generalization error.

In k-fold cross-validation, the original samples randomly partitioned into k equal sized subsamples. Of the k subsamples, a single subsample is retained as the validation data for testing the model and the remaining k−1 subsamples are used as training data. The cross-validation process is then repeated k times (the folds), which each of the case subsamples used exactly one set of validation data. The k results from the folds can then be averaged (or otherwise combined) to produce a single estimation. Ten-fold cross-validation is also commonly used.

FIG. 15B is a process for using the classifier to determine whether a node is a feature to be reported. In Step 930, Data Analysis Server 20 will extract test data from the semantic tree in question. In Step 932, the classifier is used to predict whether the feature is important.

A raw value in the data file can be found by using the range in the node and semantic tree. The node could be found using a binary search. If Data Analysis Server 20 wants to find the important features in the tree, Data Analysis Server 20 can perform a pre-order traversal of the semantic tree and find all the important features and add them to a list of the important features that need to be reported.

For example, if Data Analysis Server 20 wished to find the substring "11:50:29 EST" and wants to make some change about it, for example, label it an important feature or change its type or name, Data Analysis Server 20 will have to find out the node corresponding to that string. So the first step is to find out the range of the substring. Then, from the root of the semantic tree, Data Analysis Server 20 can find out it is split into two parts at the index of 15. Because the tree is built in a binary search tree fashion, it can be said that the node Data Analysis Server 20 wants to find is in the left subtree. Then the root of the left subtree is split at 14, so it still will be in the left tree. Then the next root splits at 13, so still in the left subtree. After that the next root is split at one so it should be in its right subtree. Then finally the node is found and the records and the node can be changed or accessed.

When finding important features, pre-order traversal is used, so it will search all the nodes in the tree in a depth-first fashion as it tries to go deep in the tree before exploring siblings. This is used because if one substring is an important feature, it is not likely that its substring will be an important feature. For example, if Data Analysis Server 20 regards "11:50:29 EST" together as a feature, the time zone EST, will not provide any new information. So in order to save some time, Data Analysis Server 20 prevents the pointer from going deeper when one important feature is found.

Each node in the semantic tree contains a position of range information. So for one node to find its corresponding value will only take O(1) time. The tree is a binary search tree so the left child of a node will always come before the right child. The user can easily find whether a string in a range is an important feature or modify whether it's an important feature in O(log n) time, where n is the number of nodes in the tree. A list of all important features in one file will need a breath first search of the tree that will take O(n) time.

Thanks to the semi-structural character of the machine-generated data, the fields in the files are actually related to each other. Normal keywords-based approaches are not able to capture the syntax and semantic relations between the fields. On the other hand, the semantic tree with regard to each line of the tree and the relation between each tokens are stored in the tree structure, thereby achieving higher accuracy.

The Knowledge Base also allows for increased accuracy. By storing regular expression patterns in the learned context free grammar expressions, and applying them on new data, Data Analysis Server 20 is performing incremental machine learning. Those heuristics learned from previous processed data can help to achieve a higher accuracy for future data.

One embodiment comprises automatically identifying which one or more data attributes to report from a first data set; using the identified one or more data attributes to report from the first data set to automatically extract one or more data attributes to report from an additional data set; and reporting based on the identified one or more data attributes to report from the first data and the extracted one or more data attributes to report from the additional data set.

One embodiment comprises a communication interface; a storage device; and a processor connected to the communication interface and the storage device. The processor is configured to use natural language processing on a first data set to automatically identify which data attributes to report of the first data set. The processor is configured to build a representation of the first data set that indicates which data attributes to report of the first data set. The processor is configured to use the representation of the first data set to identify featured data attributes to report of a second data set and report the featured data attributes.

One embodiment comprises a computer readable storage medium having computer readable program code embodied thereon for programming a processor, the computer readable program code comprising: computer readable program code configured to break up first data into individual units; computer readable program code configured to convert the units into words; computer readable program code configured to create context free grammar statements from the words; computer readable program code configured to create a semantic representation of the first data based on the context free grammar statements, the semantic representation comprises nodes that represent units of the first data and indicate position of the corresponding units in the first data; and computer readable program code configured to report information about second data based on the semantic representation of the first data.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. A computer readable storage medium (e.g., storage 24 of FIG. 1) may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code which programs a processor for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A machine-implemented method, comprising:
    obtaining a first data set from a machine generated file having plural data sets;
    using a knowledge database to automatically identify and categorize data attributes of the first data set;
    automatically identifying which one or more of the categorized data attributes of the first data set are to be reported about to an end user, where said automatic identifying includes building a semantic tree composed of a root node and child nodes coupled directly or indirectly to the root node, at least a subset of the child nodes representing context free grammar statements derived from the categorized data attributes of the first data set;
    using the built semantic tree and the identified one or more of the categorized data attributes of the first data set to automatically extract one or more data attributes to report about to the end user from an additional data set of the machine generated file; and
    reporting information about the machine generated file to the end user based on the identified one or more of the categorized data attributes from the first data set and based on the extracted one or more data attributes of the additional data set.

2. The method of claim 1, wherein
    the automatic identifying of which one or more categorized data attributes of the first data set are to be reported about to the end user from the first data set comprises using the knowledge database for converting the first data set to a plurality of tagged parts of speech and building a data structure representing the tagged parts of speech derived from the first data set.

3. The method of claim 1 wherein:
    the automatic identifying of which one or more categorized data attributes of the first data set are to be reported about to the end user from the first data set comprises breaking up the first data set into a plurality of data units, converting the data units to tagged parts of speech and using the tagged parts of speech to identify which one or more of the categorized data attributes are to be reported about to the end user.

4. The method of claim 1, wherein:
    the automatic identifying of which one or more categorized data attributes of the first data set are to be reported about to the end user from the first data set comprises:
    beginning to categorize parts of the first data set by breaking up the first data set into a plurality of tokenized data units, where the tokenized data units include at least one of words, numbers, symbols, punctuation and spaces;
    converting the tokenized data units to tagged parts of speech, wherein said converting uses the knowledge database to map the tokenized data units to corresponding tagged parts of speech based on rules stored in the knowledge database;
    creating context free grammar statements based on clustered together ones of the tagged parts of speech; and
    using the context free grammar statements to identify which one or more of the categorized data attributes are to be reported about.

5. The method of claim 1, wherein:
the automatic identifying of which one or more categorized data attributes of the first data set are to be reported about to the end user from the first data set comprises:
beginning to categorize parts of the first data set by breaking up the first data set into a plurality of tokenized data units, where the tokenized data units include at least one of words, numbers, symbols, punctuation and spaces;
converting the tokenized data units to tagged parts of speech, wherein said converting uses the knowledge database to map the tokenized data units to corresponding tagged parts of speech based on rules stored in the knowledge database;
creating context free grammar statements based on clustered together ones of the tagged parts of speech; and
building the semantic tree by generating nodes representing the tokenized data units, the tagged parts of speech, the clustered together ones of the tagged parts of speech and the context free grammar statements.

6. The method of claim 5, wherein
the generated nodes of the semantic tree include nodes that represent the broken apart portions of the first data set and indicate position of the broken apart portions within the first data set and reporting about worthiness status of those broken apart portions.

7. The method of claim 5, wherein
the generated nodes of the semantic tree include nodes that represent the broken apart portions of the first data set and indicate position, range occupied by the broken apart portions within the first data set and reporting about worthiness status of those broken apart portions.

8. The method of claim 7, wherein the using of the built semantic tree and the identified one or more of the categorized data attributes of the first data set to automatically extract one or more data attributes to report about to the end user from the additional data set comprises:
accessing the additional data set;
accessing a particular node in the semantic tree that has a reporting status indicating that data represented by that particular node should be reported about; and
using position and range of the particular node to find a corresponding particular data attribute in the additional data set.

9. The method of claim 1, wherein the automatically identifying which one or more data attributes to report from the first data set comprises:
creating a data structure representation of the first set of data that includes a plurality of nodes, each node represents a portion of the first data set; and
comparing type of node, length of node, position of node and neighboring nodes to historical data.

10. The method of claim 1, wherein:
the reporting comprises creating and displaying a dashboard based on the identified one or more data attributes that are automatically determined to be worthy of being reported about based on the first data and based on the additional data set; and
the reporting further comprises creating and displaying an alert indicting an anomaly based on the extracted one or more data attributes that are automatically determined to be worthy of being reported about based on the additional data set.

11. The method of claim 1, wherein said using the built semantic tree comprises:
automatically walking down and across the semantic tree looking for nodes marked as representing a data attribute worthy of being reported about; and
upon finding a first node marked as representing a data attribute worthy of being reported about when walking down a given chain of nodes in the semantic tree, not further walking down that given chain.

12. An apparatus, comprising:
a communication interface;
a storage device; and
a processor connected to the communication interface and the storage device, the processor being configured to use a natural language processing method on a first data set of a machine generated file having plural data sets to automatically identify data attributes of the plural data sets of the machine generated file that are worthy of being reported about to an end user, wherein the natural language processing method causes the processor to automatically build a representation of the first data set of the machine generated file, where the built representation indicates which data attributes to of the first data set are worthy of being reported about to the end user and wherein the natural language processing method causes the processor to automatically use the representation built on the basis of the first data set to identify additional data attributes of a second data set of the machine generated file that are worthy of being reported about to the end user as being featured data attributes.

13. The apparatus of claim 12, wherein:
the built representation of the first data set includes a semantic tree comprising nodes that represent attributes of portions of the first data set and indicate corresponding position and range within the first data set of data on which the represented attribute is based and where at least some of the nodes indicate a respective reporting status indicative of the worthiness of the respective attribute in being reported about to the end user.

14. The apparatus of claim 13, wherein:
the processor is configured to identify featured data attributes of the second data set by using the position and range of a node of the representation of the first data set that indicates a first reporting status for a similar attribute present in the built representation of the first data set.

15. The apparatus of claim 14, wherein:
the processor identifies an anomaly based on the featured data of the second data set and transmits an alert indicating the anomaly.

16. The apparatus of claim 12, wherein:
the processor is configured to use natural language processing on the first data set by converting the first data set to a plurality of parts of speech and building the representation of the first data set based on the parts of speech.

17. The apparatus of claim 12, wherein:
the natural language processing method operates on the first data set by breaking up the first data set into a plurality of data units, converting the data units to tagged parts of speech, clustering together similar ones among the tagged parts of speech, creating context free grammar statements based on the clustered together parts of speech and using the context free grammar statements to automatically build the representation of the first data set.

18. The apparatus of claim 17, wherein:

the processor is configured to use the representation of the first data set to identify featured data attributes of additional data sets of the machine generated file that are worthy to report about to the end user and reporting about the featured data attributes of the additional data sets to the end user.

19. A machine-implemented method of automatically extracting from machine generated big data files, comprehensible and meaningful information to report to an end user about data in the machine generated big data files, the method comprising:

automatically obtaining a first data set from a machine generated file having plural data sets;

automatically breaking up the first data set into a plurality of tokenized data units;

using a knowledge database to automatically map the tokenized data units to corresponding parts of speech;

automatically identifying those of the mapped-to parts of speech that are semantically closer to one another than others of the mapped-to parts of speech and creating clusters from the identified mapped-to parts of speech;

automatically converting the clusters into context free grammar statements;

automatically generating nodes representing the tokenized data units, the corresponding parts of speech, the clustered together ones of the parts of speech and the context free grammar statements;

automatically building a hierarchically organized semantic tree from the generated nodes, the built semantic tree being composed of a root node, child nodes coupled directly or indirectly to the root node and childless leaf nodes coupled directly or indirectly to the root node, the leaf nodes representing respective ones of the tokenized data units and indicating placement of the represented data units in the first data set;

automatically classifying the nodes of the semantic tree according to worthiness to be reported about to an end user;

generating and displaying to the end user, one or more dashboards indicating performance metrics derived from the machine generated file based on attributes of the nodes of the semantic tree that have been classified as having worthiness to be reported about to the end user.

20. The machine-implemented method of claim 19 and further comprising:

automatically removing duplicates ones of the mappings to the mapped-to parts of speech while keeping track of frequency of occurrence;

tagging and creating lists of the tagged ones of the deduplicated mappings;

for each given list, automatically determining a Levenshtein distance between the given list and the other lists;

automatically combining those of the lists that have Levenshtein distances between them that are less than a predetermined threshold;

using the combined lists as a basis for said creating of the clusters from the identified mapped-to parts of speech.

* * * * *